Patented Feb. 9, 1954

2,668,770

UNITED STATES PATENT OFFICE 2,668,770

MANUFACTURE OF MEAT-CURING COMPOSITION

Lloyd A. Hall, Chicago, Ill., assignor to The Griffith Laboratories, Inc., Chicago, Ill., a corporation of Illinois No Drawing. Application June 29, 1951,
Serial No. 234,459

7 Claims. (Cl. 99—222)

The present invention relates generally to curing salt compositions for meat and meat products, and in particular it relates to improvements in such compositions wherein an alkali metal nitrite is housed within a crystal of sodium chloride.

It is known that when a concentrated solution of sodium chloride containing a minor amount of curing salt selected from the group consisting of nitrates and nitrites of alkali metal, is flash dried, the sodium chloride forms minute crystals having heart-like centers of such curing salt, whether it be a nitrite, or a nitrate, or a mixture of the two. The process and product are described in Griffith Patent No. 2,054,624.

Commercially, such a product presents certain difficulties which have been variously overcome. When the heart-center crystals are flash dried, as on heated rotating drums, the crystals trap minute quantities of water as well as the material of the hearts. On standing, and thereby altering to more stable forms, the trapped water is released and causes the originally dry powder to cake. By including a hygroscopic agent, the latter takes up the water and minimizes or prevents the tendency to cake. As such agent commercial corn sugar, or a mixture of the latter with glycerin, has been used.

According to Hall Patent No. 2,145,417, the corn sugar with or without glycerin may be included in the solution to be dried, to distribute it uniformly for its function. However, corn sugar as an anticaking agent, was found by Hall to introduce a trace of acid, as an inherent impurity in the sugar. The acid gradually reacted with the nitrite salt of the composition to release nitrous acid. Hall avoided this and stabilized the product as to loss of nitrous acid by including a buffering agent, such as sodium bicarbonate or disodium phosphate, to insure a final pH in the composition not under pH of 7.4.

The present invention is based upon difficulties encountered in attempts to enhance the non-caking effect by increasing the content of liquid-forming hygroscopic agents, such as glycerin, sorbitol (1.2.3.4.5.6-hexanehexol) and propylene glycol, which on absorbing water form a liquid as a lubricating or partitioning agent between the crystals. It has been found that even where the pH is at or over 7.4 to avoid liberation of nitrous acid, the composition is not stable in its nitrite content, and additionally is unstable in its nitrate content. It was found that nitrite oxidized to nitrate. By practice of the present invention this oxidation may be minimized or avoided.

Studies of the difficulties have shown that the mineral content of city tap water, augmented by metallic impurities picked up by hot solutions in contact with iron, brass and the like, causes oxidation by catalysis. The metal compound impurities ionize in the presence of the aqueous liquid partitioning agent and by catalytic effect hasten oxidation of nitrite to nitrate.

It is the general object of the present invention to reduce the content of ionizable water-borne impurities which provide catalytic cations when used as described.

It is also an object to reduce substantially the hardness-forming cations of hard water when such is used as the source water for preparing the solution to be flash-dried.

It is a particular object of the invention to subject the hard source-water to cation exchange to convert the hard water to soft water.

It is a particular object to use a cation exchange material regenerated on a sodium base by sodium chloride, where sodium is the predominant metal of the curing salt composition, and sodium chloride is the predominant salt thereof.

In two widely separated places where the process is practiced, the city water has a pH varying from 7.8 to 8.2, which is favorable from the standpoint of liberation of nitrous acid. But the water is hard and high in calcium, present largely as calcium bicarbonate. A typical analysis is:

| | Parts per million |
|---|---|
| Hardness as $CaCO_3$ | 134.8 |
| Total solids | 189 |
| $SiO_2$ | 2.8 |
| Fe and Al | .2 |
| Cr | .0 |
| Mn | .0 |
| Cu | .01 |
| Pb | .04 |
| Ca | 36.8 |
| Mg | 10.4 |
| $SO_4$ | 17.2 |
| Cl | 6.0 |
| $CO_3$ | 2.0 |
| $HCO_3$ | 68.0 |
| $PO_4$ | .0022 |
| F | .07 |

By passing the water over cation exchange material having a sodium base, the water-borne cations of its impurities are replaced by sodium. These are predominantly calcium and magnesium. The new sodium ions combine with the carbonate and bicarbonate ions providing sodium carbonates which impart to the treated water a pH substantially the same as before the base exchange.

The alkalinity thus possessed by the treated water is permanent compared to that in the untreated water. The natural hard water has its mineral content largely as the bicarbonates of calcium and magnesium which are soluble, but unstable on heating. Heating breaks these dissolved salts into carbon dioxide and normal carbonates, which precipitate as scale in boilers, pipes and other equipment, resulting in a lowered pH of the residual water. The lowered pH renders the water more corrosive on metal to pick up trace amounts of metals such as copper, iron, zinc, chromium, nickel, cobalt and manganese. These last-mentioned elements in cation form are stronger oxidation catalysts than the cations of calcium and magnesium. Accordingly, even though the heating of hard water reduces the amount of catalytic cations, it favors the adoption of smaller amounts of more potent ones.

However, using a base exchange material which substitutes sodium for calcium and magnesium ions, the result is to convert the bicarbonates of calcium and magnesium to bicarbonate of sodium. The latter, like other bicarbonates, on heating is subject to loss of carbon dioxide to form sodium carbonate, which is more alkaline and more stable than the sodium bicarbonate. Therefore, on heating the treated water, it is rendered more alkaline, and less corrosive on metal, whereby it picks up less of the more powerful metal catalyst cations. Because the water, treated or not, is used hot as a substantially saturated solution of sodium chloride containing also the sodium nitrite and sodium nitrate, the new alkalinity functions to offset to some extent the corrosiveness inherent in chloride anions on metal. Hence, the treated water functions better in respect to adopting metallic cations in both circumstances with and without sodium chloride dissolved therein.

In using sodium base exchange material, whether of zeolite, resinous or other materials, all well known, it is customary to regenerate them with strong sodium chloride solutions. These materials act by mass action. Initially fresh material ready for use is substantially free from soluble content, and it consists of insoluble material having a sodium salt structure. On passing hard water over the insoluble material, the free calcium, magnesium, iron or other cations change place with the bound sodium of the exchange solid. The original sodium salt structure thus changes to include a salt structure of calcium, magnesium, iron or other metal, until its ability to exchange becomes exhausted. By reversing the direction of mass action by passing a strong sodium chloride solution over the exhausted exchange solid, the latter gives up the cations it borrowed from the hard water and takes back sodium, thus forming in the regenerating sodium chloride solution chlorides of calcium, magnesium, iron, or other exchangeable metals. When the sodium salt structure is regenerated, the solid material must be washed out to remove the residual sodium chloride solution containing the newly formed chlorides of calcium, magnesium, iron and possibly other metals. This washing must be quite thorough when such treatment is used to soften hard waters for domestic use. Otherwise, the treated water first passing a newly regenerated exchange material will be "salty."

In the present invention, such thoroughness in washing is not required, because sodium chloride is to be added to the water. It is for this reason that the preferred process involves a sodium base exchange material and regeneration thereof with sodium chloride. However, it is to be observed that the heart-center curing salt may include some potassium salts (see Griffith No. 2,054,624), and where the ultimate curing salt is not to be an all-sodium base, potassium may be the metal of the exchange salt structure and potassium chloride may be the regenerating salt.

Using unsoftened hard water, as described to make a heart-center crystal composition, about 910 gallons is used to make a solution having approximately 27.4% solids content by weight, using any one of the following exemplary compositions A, B or C, given in parts by weight:

|  | A | B | C |
| --- | --- | --- | --- |
| Sodium chloride | 2,481 | 2,198 | 2,407 |
| Sodium nitrate | 117 | 231 | 191 |
| Sodium nitrite | 173 | 342 | 173 |
| Glycerin | 9 | 9 | 9 |

Such solution is heated to 165° to 185° F. and then sprayed or splashed onto rotating drying drums heated at 160° C., whereon it quickly dries to fine powdery crystals, removed by a scraper.

In the foregoing examples the glycerine is representative of hygroscopic agents for the purpose described, other suitable ones being sorbitol and propylene glycol, for use preferably in amount upwardly from approximately 3 parts by weight to 1000 parts of total salt content.

In dissolving the salt ingredients in unsoftened hard water, and in heating as described, the salt content has a precipitating effect on calcium and magnesium carbonate. Particles of varying sizes thus become suspended in the salt solution, which tends to minimize settling of the precipitate by reason of its high specific gravity. Unless these particles are filtered away, the solution fed to the flash-drying equipment includes the suspended solids, which become contaminants of the dried curing salt, and foci for catalytic ions. By the exchange process of the present invention, the suspended solids are avoided, filtration is not needed, and the contaminants are not present in the final product.

Typical curing salt compositions resulting from untreated and treated tap water have impurities as follows:

|  | Parts per Million | |
| --- | --- | --- |
|  | Untreated | Treated |
| Cu | 2.0 | 1.0 |
| Cr | 0.5 | 0.5 |
| Fe₂O₃ | 5.5 | 3.0 |
| Ni | 0.8 | .8 |
| Co | 0.2 | .2 |
| Pb | 0.2 | .2 |
| Mn | 0.2 | .2 |
| Al₂O₃ | 2.0 | .5 |
| Ca | 25.0 | 0 |
| Mg | 6.0 | 0 |

Without treatment of the water, and with a content of aqueous liquid partitioning agent, the non-caking composition is stable in its nitrite content for about three weeks when packed in large sized drums of about 300 lbs. In smaller volume the period of stability is shorter.

With treated water as described the said three-week period of stability is lengthened to about 10 months. All this is due not only to the lessened quantity of calcium and magnesium ions, but to the described side effects resulting from the process of removing them by a potassium or sodium base exchange material, preferably sodium.

It is to be understood that the benefits of the process are not immediate and that they appear in time, which is important where prepared material is stored between the time of manufacture and the time of use. As prepared it is dry and powdery, and if it were to be used immediately, no agent would be used to prevent caking. But it is in the contemplated period of storage when latent water is released to cause caking, and it is for this contingency that the non-caking agent is used, which forms aqueous partitioning liquid, which in turn induces ionization to produce catalytic cations, which in turn accelerate conversion of nitrite to nitrate.

The process described eliminates some undesirable cations and the causes for adoption of other undesirable cations. Of course, the matter of purity of the salts used is a matter for consideration. It is assumed that the salts used are pure or of sufficient purity not to negative the advantages described. If impure salts are used, however, there are other treatments which may be used with or without practice of the present invention, which produce satisfactory stable compositions.

It is to be understood that the proportions of sodium chloride and of alkali metal nitrite, with or without alkali metal nitrate, may be changed as well known in the art, without departing from the spirit and scope of the present invention as set forth in the accompanying claims.

I claim:

1. The method which comprises subjecting a water containing hardness resulting from dissolved carbonates of metals selected from the group consisting of calcium and magnesium to base-exchange with insoluble alkali-metal-base exchange material capable of yielding to the water the alkali-metal of its alkali-metal salt structure, whereby to convert the said carbonates to a carbonate of alkali metal, dissolving in said treated water quantities of sodium chloride, and of oxygen-containing nitrogen meat-curing salt of alkali metal including essentially alkali-metal nitrite, said quantities being such as to form from said solution on flash drying a mass of sodium chloride crystals having heart-like centers of said oxygen-containing nitrogen curing salt, adding also to said treated water for each 1000 parts by weight of total salt upwardly from approximately 3 parts by weight of hygroscopic material selected from the group consisting of glycerin, sorbitol and propylene glycol, and flash drying said solution to heart-center crystals.

2. The method which comprises subjecting a water containing hardness resulting from dissolved carbonates of metals selected from the group consisting of calcium and magnesium to base-exchange with insoluble sodium-base exchange material capable of yielding to the water the sodium of its sodium salt structure, whereby to convert the said carbonates to a carbonate of sodium, dissolving in said treated water quantities of sodium chloride, and of oxygen-containing nitrogen meat-curing salt of alkali metal including essentially alkali-metal nitrite, said quantities being such as to form from said solution on flash drying a mass of sodium chloride crystals having heart-like centers of said oxygen-containing nitrogen curing salt, adding also to said treated water for each 1000 parts by weight of hygroscopic material selected from the group consisting of glycerin, sorbitol and propylene glycol, and flash drying said solution to heart-center crystals.

3. The method which comprises subjecting a water containing hardness resulting from dissolved carbonates of metals selected from the group consisting of calcium and magnesium to base-exchange with insoluble sodium-base exchange material capable of yielding to the water the sodium of its sodium salt structure, whereby to convert the said carbonates to a carbonate of sodium, dissolving in said treated water quantities of sodium chloride, and of oxygen-containing nitrogen meat-curing salt of sodium including essentially sodium nitrite, said quantities being such as to form from said solution on flash drying a mass of sodium chloride crystals having heart-like centers of said oxygen-containing nitrogen curing salt, adding also to said treated water for each 1000 parts by weight of total salt upwardly from approximately 3 parts by weight of hygroscopic material selected from the group consisting of glycerin, sorbitol and propylene glycol, and flash drying said solution to heart-center crystals.

4. The method which comprises subjecting a water containing hardness resulting from dissolved carbonates of metals selected from the group consisting of calcium and magnesium to base-exchange with insoluble alkali-metal-base exchange material capable of yielding to the water the alkali metal of its alkali-metal salt structure, whereby to convert the said carbonates to a carbonate of alkali metal, dissolving in said treated water quantities of sodium chloride, and of nitrite and nitrate of alkali metal, said quantities being such as to form from said solution on flash drying a mass of sodium chloride crystals having heart-like centers of said alkali metal nitrite and nitrate, adding also to said treated water for each 1000 parts by weight of total salt upwardly from approximately 3 parts by weight of hygroscopic material selected from the group consisting of glycerin, sorbitol and propylene glycol, and flash drying said solution to heart-center crystals.

5. The method which comprises subjecting a water containing hardness resulting from dissolved carbonates of metals selected from the group consisting of calcium and magnesium to base-exchange with insoluble sodium-base exchange material capable of yielding to the water the sodium of its sodium salt structure whereby to convert the said carbonates to a carbonate of sodium, dissolving in said treated water quantities of sodium chloride, and of nitrite and nitrate of alkali metal, said quantities being such as to form from said solution on flash drying a mass of sodium chloride crystals having heart-like centers of said alkali metal nitrite and nitrate, adding also to said treated water for each 1000 parts by weight of total salt upwardly from approximately 3 parts by weight of hygroscopic material selected from the group consisting of glycerin, sorbitol and propylene glycol, and flash drying said solution to heart-center crystals.

6. The method which comprises subjecting a water containing hardness resulting from dissolved carbonates of metals selected from the group consisting of calcium and magnesium to base-exchange with insoluble sodium-base exchange material capable of yielding to the water the sodium of its sodium salt structure, whereby to convert the said carbonates to a carbonate of sodium, dissolving in said treated water quantities of sodium chloride, and of nitrite and nitrate of sodium, said quantities being such as to form from said solution on flash drying a mass of sodium chloride crystals having heart-like centers of said sodium nitrite and nitrate, adding also to said treated water for each 1000 parts by weight of total salt upwardly from approximately 3 parts by weight of hygroscopic material selected from the group consisting of glycerin, sorbitol and propylene glycol, and flash drying said solution to heart-center crystals.

7. The method which comprises subjecting a water containing hardness resulting from dissolved carbonates of metals selected from the group consisting of calcium and magnesium to base-exchange with insoluble alkali-metal-base exchange material capable of yielding to the water the alkali metal of its alkali-metal salt structure, whereby to convert the said carbonates to a carbonate of alkali metal, dissolving in said treated water quantities of sodium chloride, and of oxygen-containing nitrogen meat-curing salt of alkali metal including essentially alkali-metal nitrite, said quantities being such as to form from said solution on flash drying a mass of sodium chloride crystals having heart-like centers of said oxygen-containing nitrogen curing salt, adding also to said treated water a small quantity of water-soluble hygroscopic material which in taking on water forms a liquid partitioning anti-caking agent between crystals, and flash drying said solution to heart-center crystals.

LLOYD A. HALL.

References Cited in the file of this patent

UNITED STATES PATENTS

| Number | Name | Date |
|---|---|---|
| 2,054,623 | Griffith | Sept. 15, 1936 |
| 2,054,624 | Griffith | Sept. 15, 1936 |
| 2,145,417 | Hall | Jan. 31, 1939 |